United States Patent [19]

Bartholome

[11] Patent Number: 5,660,608
[45] Date of Patent: Aug. 26, 1997

[54] FILTER CARTRIDGE BOOT

[75] Inventor: Bernard C. Bartholome, Louisville, Ky.

[73] Assignee: ECO Corporation, Louisville, Ky.

[21] Appl. No.: 542,388

[22] Filed: Oct. 12, 1995

[51] Int. Cl.⁶ .................................................. B01D 46/02
[52] U.S. Cl. ........................ 55/498; 55/502; 55/508
[58] Field of Search ......................... 55/341.1, 376, 55/377, 378, 498, 562, 511, 507, 508, 521, 524, 516; 95/273; 210/486, 487, 493.2

[56] References Cited

U.S. PATENT DOCUMENTS

| | | | |
|---|---|---|---|
| 3,395,208 | 7/1968 | Witchell | 55/502 |
| 3,951,627 | 4/1976 | Barr, Jr. | 55/284 |
| 4,073,632 | 2/1978 | Reinauer et al. | 55/374 |
| 4,089,664 | 5/1978 | Noland | 55/341.1 |
| 4,138,234 | 2/1979 | Kubesa | 55/374 |
| 4,159,197 | 6/1979 | Schuler et al. | 55/379 |
| 4,266,954 | 5/1981 | Oare et al. | 55/377 |
| 4,272,263 | 6/1981 | Hancock | 55/377 |
| 4,276,069 | 6/1981 | Miller | 55/502 |
| 4,306,893 | 12/1981 | Fernando et al. | 55/302 |
| 4,435,197 | 3/1984 | Nijhawan et al. | 55/341.1 |
| 4,436,536 | 3/1984 | Robinson | 55/502 |
| 4,443,237 | 4/1984 | Ulvestad | 55/598 |
| 4,445,915 | 5/1984 | Robinson | 55/378 |
| 4,765,811 | 8/1988 | Beckon | 55/498 |
| 5,006,235 | 4/1991 | Cooper | 55/521 |
| 5,308,485 | 5/1994 | Griffen et al. | 55/376 |
| 5,350,515 | 9/1994 | Stark et al. | 55/502 |
| 5,500,029 | 3/1996 | Zievers et al. | 55/524 |
| 5,536,290 | 7/1996 | Stark et al. | 55/498 |

*Primary Examiner*—Jay H. Woo
*Assistant Examiner*—Duane S. Smith
*Attorney, Agent, or Firm*—Middleton & Reutlinger; John F. Salazar

[57] ABSTRACT

A filter boot having a radially extending annular flange which is used to properly seat the filter boot to a tube sheet. The filter boot utilizes two annular recesses for properly affixing a pleated filter to the filter boot. A deep annular upper recess is provided at the end of the boot closest to the flange. An opposing lower annular recess faces opposite the first recess. Both the upper and lower annular recesses are separated by an annular base which has a plurality of holes located therein allowing potting compound to enter the entirety of the lower recess and a small portion of the upper recess. The perimeter of the area where the potting compound is held is stepped so that the boundary of the potting compound follows a tortuous path to better seal the boot and filter combination. The filter is potted within the lower recess while the potting compound remains fluid and dries around the filter securely affixing it within the lower recess of the boot.

15 Claims, 6 Drawing Sheets

FILTER CARTRIDGE BOOT

BACKGROUND OF THE INVENTION

1. Field of the Invention

The present invention relates to filter boots which are affixed to pleated filters and then hung within a baghouse allowing air to pass through the filter and through the boot.

2. Discussion of the Prior Art

Boots for filters are generally well known. Typically, a boot having an annular recess is formed from an elastomeric compound. Within the annular recess, an airway is formed allowing air to flow through the bottom or base portion of the annular recess. This airflow channel is formed by having an opening located within the base portion of the annular recess. The boot is cast with a stop plate or metal ring reinforcing the base of the annular recess and with one surface of the metal ring outwardly exposed. A potting compound is poured into the recess containing the exposed metal ring. A circular pleated filter is potted into the annular recess of the boot and held into place once the potting compound dries. Sometimes, a screw is inserted through the potting compound and boot and into the stop plate to further secure the ring within the boot. Air passes through the filter and up through the airway of the boot. However, the filter sometimes needs to be purged to clean debris or other material which may collect on the outside of the filter. To accomplish this, the air flow is reversed under high pressure. This purge sometimes causes the metal ring to come loose from within the boot thereby removing the seal between the boot and the ring and decreasing the efficiency of the filter because air may now flow through the boot around the metal ring instead of through the boot airway.

SUMMARY OF THE INVENTION

The present invention is for a boot which has a filter potted into a lower annular recess. The boot also has an opposing upper annular recess which is deeper than the lower recess. Separating the lower and upper annular recess is an annular base which forms an annulus. The annular base has a plurality of holes located therein. A plug is inserted into the upper annular recess and the boot is inverted so that the lower annular recess faces upward. A potting compound is poured into the lower annular recess. The potting compound flows through the holes in the annular base and into the upper annular recess up to the plug. Before the potting compound dries, the filter element is potted into the lower annular recess. The boot may then be inserted into the tube sheet which receives the boot.

More particularly, the present invention comprises a filter boot, comprising: a radially extending annular flange; an outer wall extending downward from said annular flange; an annular base extending inward from said outer wall forming an upper annular recess and a lower annular recess; an air flow channel extending upwardly and downwardly from the interior perimeter of said annular base; and, a plurality of apertures formed through said annular base.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 2:
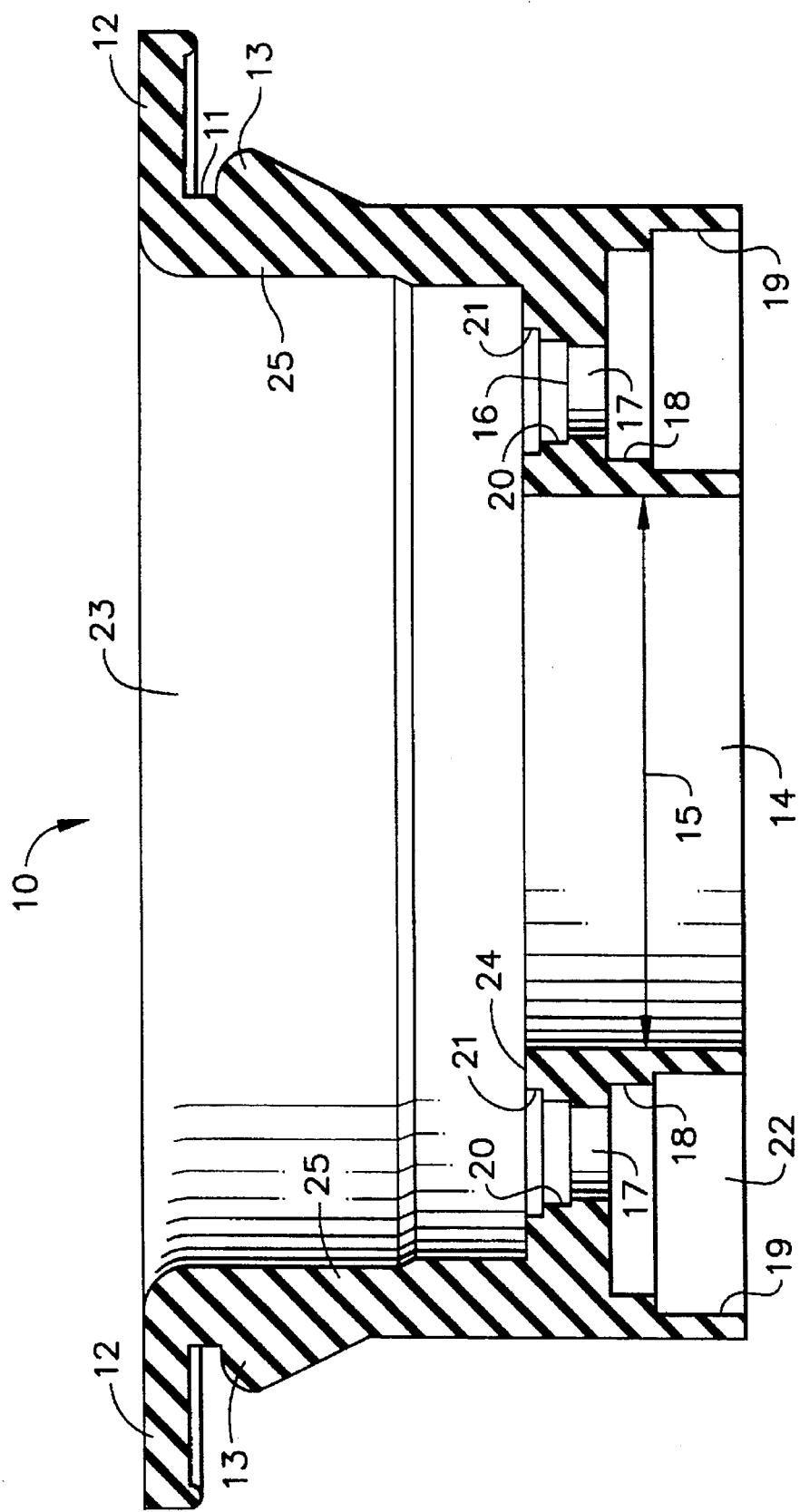
FIG. 2 is a sectional side view of the boot of the present invention.

Referring now to the Figures, FIG. 2 shows the filter boot 10 of the present invention. Filter boot 10 has a radially extending annular flange 12. Extending downward from annular flange 12 is boot outer wall 25. Interposed within the interior of filter boot 10 is an inwardly extending annular base 16. Annular base 16 is an annulus having an interior and exterior perimeter, said perimeters bounding an area which forms the base of both an upper recess 23 and lower recess 22. Formed on the interior perimeter of the annulur or annular base 16 is interior wall 14 which extends upwards and downwards therefrom. Filter boot 10 has back to back opposing annular recesses formed by said interior wall 14 and annular base 16, deep upper annular recess 23 and shallow lower annular recess 22, both shown in FIG. 2. Upper and lower annular recess 23 and 22 are in back to back opposing relationship. Upper and lower annular recesses 23 and 22 are separated by the annular base 16 which has a plurality of holes 17 formed therein. Annular base 16 forms a bottom ring which is the base of both annular recesses 22 and 23.

Outer wall 25 which extends downward from annular flange 12 has a predefined thickness which is different for both upper annular recess 23 and lower annular recess 22. As seen in FIG. 2, the thickness of outer wall 25 is greater for that area adjacent to upper annular recess 23. The portion of outer wall 25 which is adjacent to lower annular recess 22, that section congruent with stepped side walls 18 and 19, has a thickness which is less than that of the section adjacent to upper annular recess 23. Upper annular recess 23 is subjected to increased vacuum pressure when the filter boot is utilized as air is drawn from a vacuum source located above recess 23. The lower annular recess 22 is filled with hardened potting compound thereby requiring less lateral support from the outer wall 25. Thus, the thickness of the outer wall 25 is thickest at that area adjacent to the upper recess 23 while leaving the lower recess 22 with a reduced width.

Figure 6:
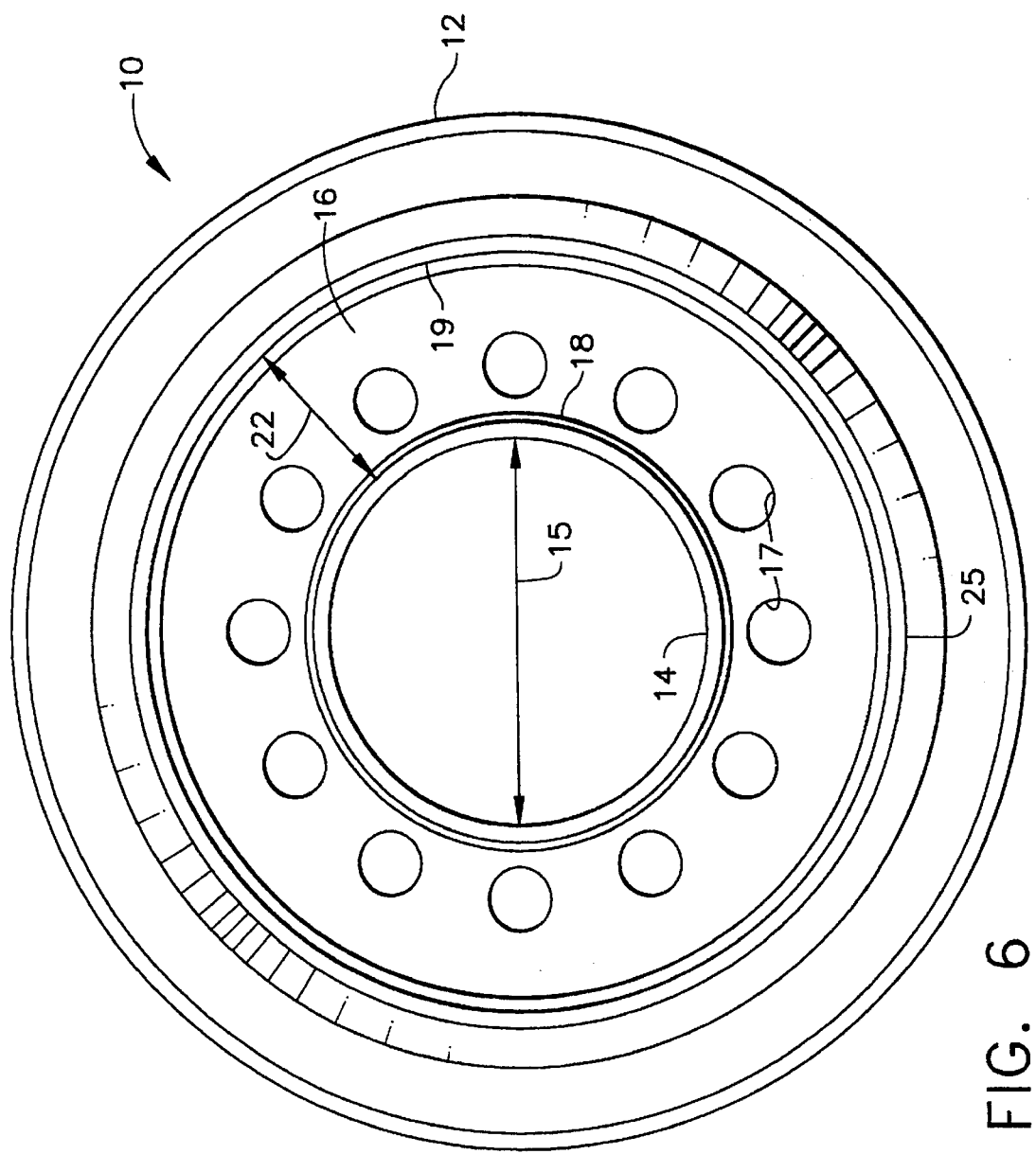
FIG. 6 is a bottom view of the boot of the present invention.

Annular base or annulus 16, better shown in FIG. 6, has a thickness in the upper annular recess which narrows as outer wall 25 extends towards the annular base 16. Thus, annular base 16 is narrowest at the base of both upper and lower recess 23 and 22. This is accomplished through a series of stepped side walls 20 and 21, shown in FIG. 2, formed in annular base or annulus 16 for upper annular recess 23 and 18 and 19 formed in side walls 25 and 14 for lower annular recess 22. To reach the narrow diameter of base 16 in upper recess 23, deep upper annular recess 23 has a first side wall 25 and stepped side walls 21 and 20. Opposing walls 20 and 21 form a recessed channel within upper annular recess 23 and formed within annular base 16. Stepped side walls 20 and 21 also form the recessed channel of upper annular recess 23 within which potting compound 31, shown in FIG. 3, dries within.

Potting compound 31, shown in FIG. 3, must be an appropriate material such that it may be poured in fluid form within the boot and flow through apertures 17 and subsequently dry thereby incorporating the annular base 16, the pleated filter 30 and the upper and lower annular recesses containing said compound. This may be an epoxy material, Room Temperature Vulcanizing rubber or urethane. Preferentially, an epoxy material is used as it exhibits appropriate fluidity when poured, adequate drying time and good strength in bonding the filter and boot together. The potting material 31 and aperture combination provides a means for mechanically locking the filter and potting compound together such that the potting compound is integral with the annular base 16. The potting compound 31 incorporates the ring structure or annulus 16 of the boot 10 within itself upon drying so that the potting compound may not come loose from the filter boot. Additionally, the potting compound provides a molecular bond, bonding the compound material with the filter boot 10 and also with the pleated filter 30. The design of having both types of bonding and locking make this filter boot ideal for securely affixing a pleated filter within the boot without leakage of air around the potting compound or without breaking the compound seal upon purging the filter by high pressure reverse airflow.

Figure 3:
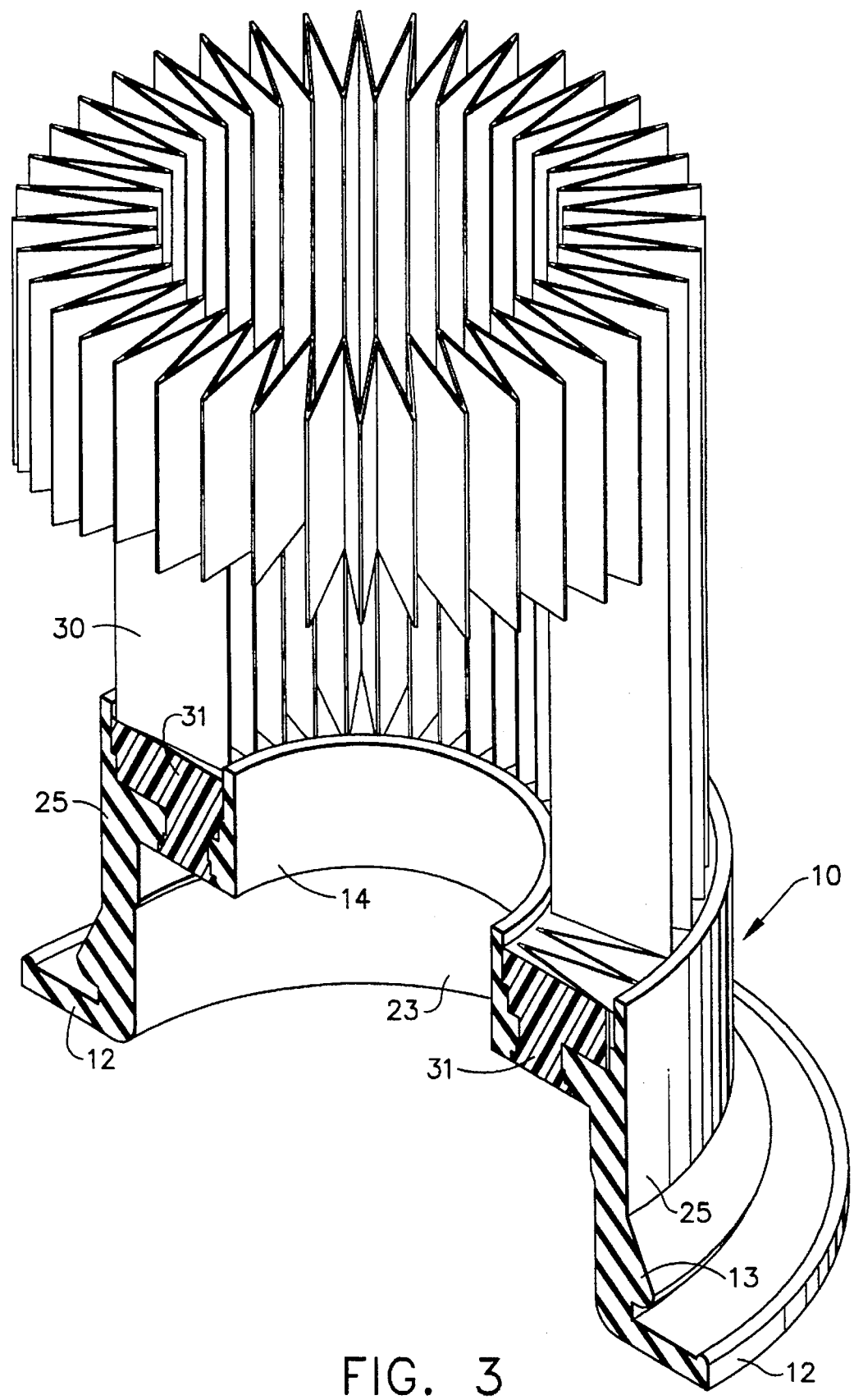
FIG. 3 is a sectional isometric view of an assembled boot and filter of the present invention.
Figure 4:
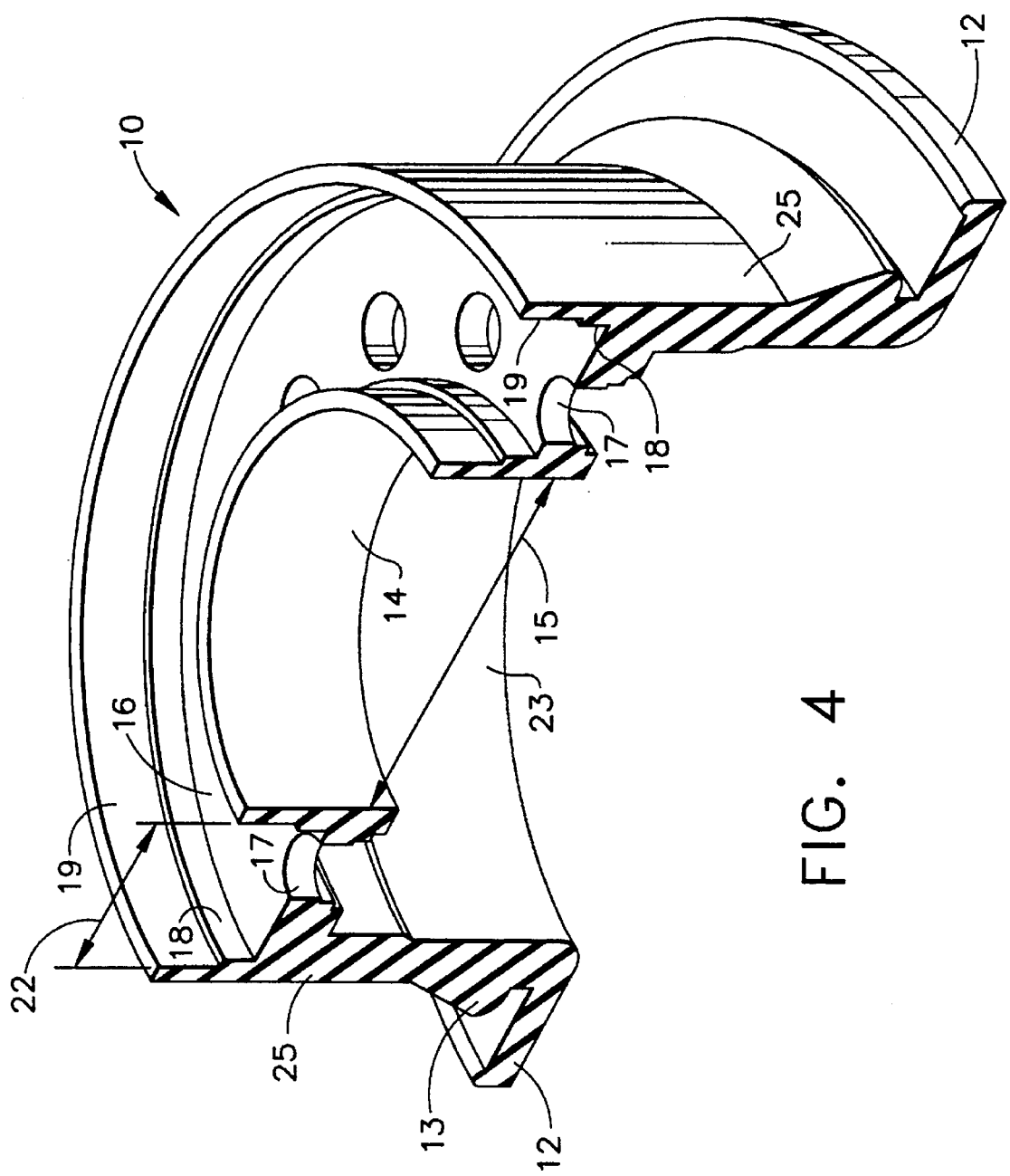
FIG. 4 is a sectional isometric view of the boot of FIG. 1 with the boot inverted.

Referring now to FIG. 4, lower annular recess 22 is shown. Annular recess 22 is formed by opposing stepped side walls 19 and 18 formed along interior wall 14 and outer wall 25. Lower annular recess 22 is the recess which receives the cylindrical pleated filter 30 shown in FIG. 3. The entirety of lower annular recess 22 also receives potting compound 31. Annular base 16 separates lower recess 22 and upper recess 23 and allows both annular recesses to be in back to back opposing relationship. Lower recess 22 has an outer perimeter defined by boot outer wall 25, a base defined by annular base 16, an interior wall defined by interior wall 14, and stepped side walls 18 and 19 which narrow the cross-sectional diameter of recess 22.

A plurality of holes or apertures 17 are formed within the annular base 16. Holes 17 allow fluid potting compound material poured into lower recess 22 to flow into upper recess 23. Potting compound 31 enters into upper recess 23 up to and including side walls 20 and 21. Potting compound 31 completely fills lower recess 22. A plug, inserted into upper recess 23 and abutting against rim 24 of interior wall 14, prevents potting compound from flowing further into upper recess 23. After drying, the plug is removed and potting compound extends through annular base 16 through holes 17 and within the channel formed by side walls 20 and 21 in the upper annular recess 23. Thus, the potting compound is poured when boot 10 is inverted so that lower recess 22 is directed upwards. The potting compound is integral with annular base 16 and is thereby held securely in place without the need for additional means to secure the dried potting compound 31 within lower annular recess 22 and the channel of upper recess 23 formed by stepped side walls 20 and 21.

Figure 1:
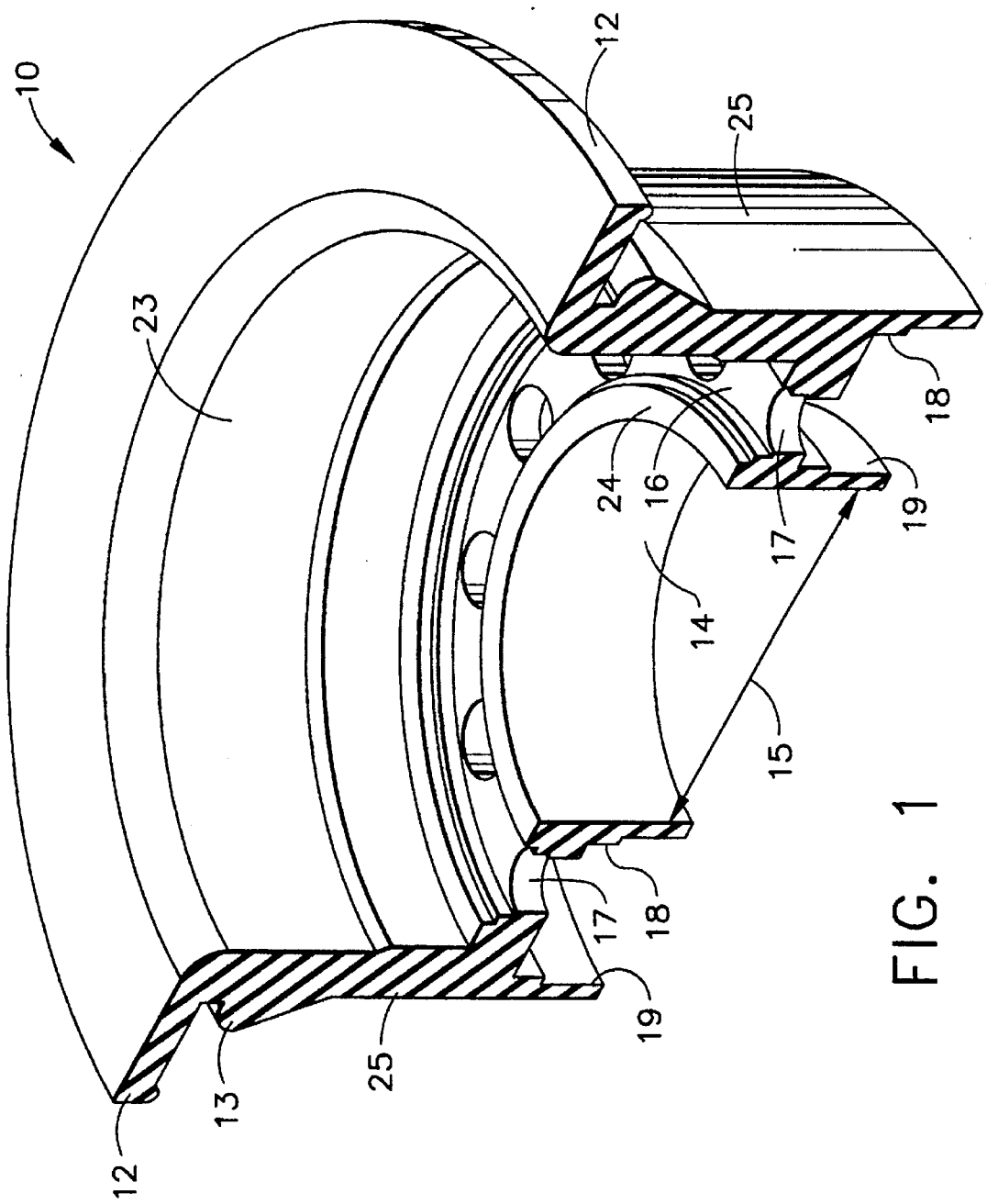
FIG. 1 is a sectional isometric view of the boot of the present invention.

Centrally disposed between lower and upper recess 22 and 23 is cylindrical interior wall 14, shown in FIGS. 1 and 4. Interior wall 14 forms at the interior perimeter of annular base 16 and extends upwardly and downwardly therefrom. Interior wall 14 extends upwardly into upper annular recess 23 and downwardly into lower annular recess 22. Interior wall 14 defines air flow path 15 through which air passes through the filter boot 10. Interior wall 14 in conjunction with annular base 16 and outer wall 25 creates dual opposing channels which receive the fluid potting compound. The first channel is lower annular recess 22 itself defined by stepped side walls 18 and 19, annular base 16 and interior wall 14. The second opposing channel is formed within upper annular recess 23 and is defined by stepped side walls 20 and 21, interior wall 14 and annular base 16. Stepped sidewalls 18 and 19 of lower annular recess 22 and stepped sidewalls 20 and 21 of upper annular recess 23 create a tortuous path perimeter of the potting compound 31, shown in FIG. 3, inhibiting air flow around the potting compound boundary. This tortuous path around the potting compound boundary prevents air seepage through holes 17 around potting compound 31 and furthers the air flow through air flow channel 15.

Figure 5:
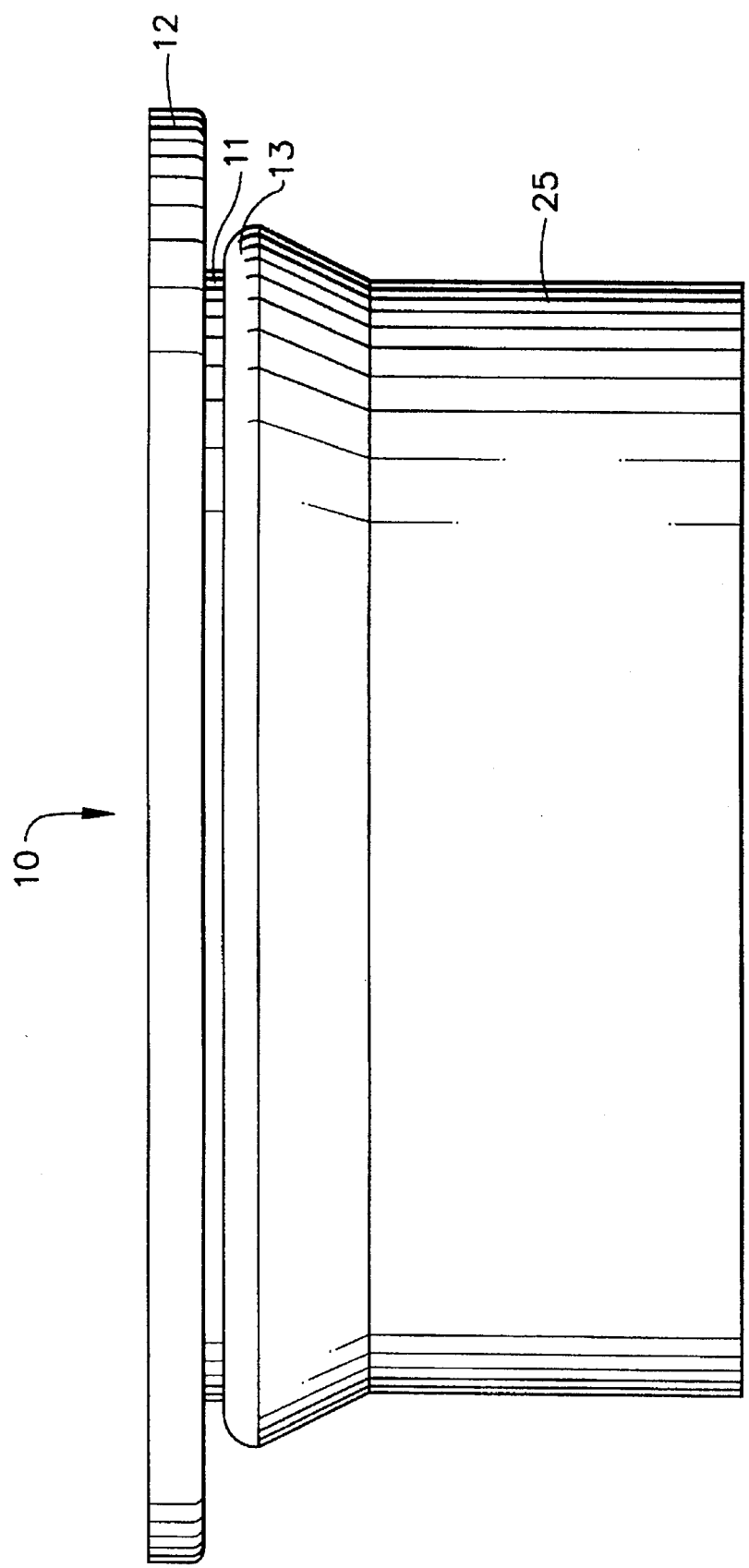
FIG. 5 is side view of the boot of the present invention.

As seen in FIG. 5, boot 10 has radially extending flexible annular flange 12 and locking rim 13 which form elastomeric annulus 11 therebetween. Locking rim 13 is formed along outer wall 25 extending outward therefrom and just below annular flange 12. In one embodiment where the filter boot 10 of the present invention acts as a top boot, boot 10 is affixed to a tube sheet which has a plurality of circular openings throughout. Flange 12 is flexible enough so that the top boot 10 may be inserted up through the tube sheet with flange 12 exposed on the upper side of the tube sheet, the perimeter of the opening in the tube sheet seated within elastomeric annulus 11, and locking rim 13 compressing upwards against the underside of the tube sheet. The filter 30 would thereby extend downward from the filter top boot 10. The opposite end of filter 30 has a plug affixed thereto. Air is then drawn through the filter, upwards through air flow channel 15 and through top boot 10. Potting compound 31, shown in FIG. 3, creates a tight seal in boot 10 preventing any air flow around the potting compound 31 and only allowing air to flow through boot 10 via air flow channel 15. Alternatively, filter boot 10 may act as a bottom boot whereby filter 30 would extend upwards therefrom. In either embodiment however, filter 30 is potted within lower annular recess 22 and affixed thereto by potting compound 31, as is shown in FIG. 3.

As seen in FIG. 3, pleated filter 30 is potted into the potting compound 31 which fills lower annular recess 22 and a portion of upper annular recess 23. As noted above, in order to fill lower recess 22 with potting compound, a plug is inserted into upper annular recess 23, its diameter flush with outer wall 25. The plug is inserted into the upper annular recess 23 until it rests against the upper rim 24 of interior wall 14. The top boot and plug combination is then inverted. Potting compound 31 is poured into lower annular recess 22 until the potting compound fills the area adjacent to interior wall 14 and stepped side walls 18 and 19. While the potting compound is still fluid, cylindrical pleated filter 30 is potted into the lower annular recess 22 of boot 10 as shown. The potting compound is then allowed to dry and harden. The result, as shown in FIG. 3, provides a filter boot having potting compound affixing the filter to the boot, said potting compound having a tortuous boundary path inhibiting air flow around said material. The potting compound 31 additionally is integral with annular base 16 so that the potting compound fully incorporates the annular base 16. This structure firmly secures the dried potting compound 31 within lower and upper annular recess 22 and 23. After drying, the opposite end of the filter 30 is capped using commonly known techniques thereby allowing air flow only through the filter medium and not around either the boot 10 or the subsequently affixed end cap.

Boot 10 must be comprised of an elastomeric material allowing annular flange 12 to be folded about an attachment aperture located within tube sheet. Additionally, the boundary of the aperture located in the tube sheet must be securely seated within elastomeric annulus 11. This ensures proper sealing of the boot 10 within the tube sheet and allows air flow only through the filter and boot combination. By providing for the tortuous path of the boundary of potting compound 31, a tight seal is provided preventing the potting compound from coming loose within either upper or lower annular recess 23 and 22 and preventing air seepage around the potting compound boundary.

Preferably, the boot material is comprised of SANTOPRENE or other thermoplastic elastomer due to its strength and temperature capabilities. The plug utilized in pouring in the epoxy material or potting compound is preferably metallic and has a diameter such that it fits snugly within upper annular recess 23 firmly pressing against side wall 25.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A filter boot, comprising:

a radially extending annular flange;

an outer wall extending downward from said annular flange;

an annular base extending inward from said outer wall forming an upper annular recess and a lower annular recess and having an interior perimeter;

an interior wall extending upwardly and downwardly from said interior perimeter and forming an air flow channel from said interior perimeter of said annular base; and, a plurality of apertures formed through said annular base.

2. The filter boot of claim 1 further comprising a locking rim formed below said annular flange and extending outwardly from said outer wall.

3. The filter boot of claim 1 wherein said annular base forming said upper annular recess has opposing stepped side walls forming a recessed channel within said upper annular recess.

4. The filter boot of claim 1 wherein said lower annular recess has opposing stepped side walls formed along said air flow channel and said outer wall.

5. The filter boot of claim 1 wherein said filter boot is comprised of a thermoplastic elastomer.

6. The filter boot of claim 1 wherein said air flow channel is further comprised of an interior wall extending upwardly and downwardly from said annular base.

7. The filter boot of claim 6 wherein said interior wall creates a recessed channel within said upper annular recess.

8. The filter boot of claim 7 wherein said recessed channel of said upper annular recess is in flow communication with said lower annular recess.

9. A filter boot, comprising:

a radially extending annular flange;

an outer wall extending downward from said annular flange;

an annulus extending inward from said outer wall;

an interior wall extending upwardly and downwardly from the interior perimeter of said annulus, said interior wall forming an air flow channel;

a plurality of apertures formed in said annulus.

10. The filter boot of claim 9 wherein said outer wall has a locking rim extending outwardly therefrom directly below said annular flange.

11. The filter boot of claim 9 wherein said annulus forms a base for an upper annular recess and a lower annular recess.

12. The filter boot of claim 11 wherein said annulus has a recessed channel within said upper annular recess.

13. The filter boot of claim 12 wherein said plurality of apertures formed in said annulus are located within said recessed channel of said upper annular recess.

14. The filter boot of claim 11 wherein said interior wall and said outer wall of said lower annular recess have opposing stepped sidewalls.

15. A filter, comprising:

a filter boot, said filter boot having:

(a) a radially extending annular flange;

(b) an outer wall extending downward from said outer flange;

(c) an annulus extending inwardly from said outer wall forming a base for an upper annular recess and a lower annular recess, said annulus forming a recessed channel within said upper annular recess;

(d) an interior wall extending upwardly and downwardly from the interior perimeter of said annulus;

(e) a plurality of holes formed within said annulus;

a pleated filter placed within said lower annular recess and;

potting compound extending within said lower annular recess and at least a portion of said upper annular recess securely affixing said pleated filter within said lower annular recess.

* * * * *